United States Patent
Clayfield et al.

(10) Patent No.: US 9,580,587 B2
(45) Date of Patent: Feb. 28, 2017

(54) POLYMER COMPOSITIONS WITH IMPROVED RETENTION OF PROPERTIES UNDER MECHANICAL AND THERMAL STRESSES

(71) Applicants: Timothy E. Clayfield, Waedenswil (CH); Arnis U. Paeglis, Friendswood, TX (US)

(72) Inventors: Timothy E. Clayfield, Waedenswil (CH); Arnis U. Paeglis, Friendswood, TX (US)

(73) Assignee: Dow Global Technologies LLC, Midland, MI (US)

( * ) Notice: Subject to any disclaimer, the term of this patent is extended or adjusted under 35 U.S.C. 154(b) by 352 days.

(21) Appl. No.: 14/350,954

(22) PCT Filed: Oct. 9, 2012

(86) PCT No.: PCT/US2012/059278
§ 371 (c)(1),
(2) Date: Apr. 10, 2014

(87) PCT Pub. No.: WO2013/055642
PCT Pub. Date: Apr. 18, 2013

(65) Prior Publication Data
US 2014/0287178 A1    Sep. 25, 2014

Related U.S. Application Data

(60) Provisional application No. 61/545,281, filed on Oct. 10, 2011.

(51) Int. Cl.
| | |
|---|---|
| *C08L 23/16* | (2006.01) |
| *C08L 23/14* | (2006.01) |
| *C08L 23/08* | (2006.01) |
| *C08L 23/20* | (2006.01) |
| *F16L 9/14* | (2006.01) |
| *F16L 11/04* | (2006.01) |
| *C08L 23/18* | (2006.01) |

(52) U.S. Cl.
CPC .............. *C08L 23/16* (2013.01); *C08L 23/08* (2013.01); *C08L 23/0807* (2013.01); *C08L 23/14* (2013.01); *C08L 23/142* (2013.01); *C08L 23/18* (2013.01); *C08L 23/20* (2013.01); *F16L 9/14* (2013.01); *F16L 11/04* (2013.01); *C08L 2205/02* (2013.01); *C08L 2312/00* (2013.01); *Y10T 428/139* (2015.01); *Y10T 428/1352* (2015.01); *Y10T 428/1386* (2015.01); *Y10T 428/1393* (2015.01); *Y10T 428/1397* (2015.01)

(58) Field of Classification Search
CPC ...... C08L 23/08; C08L 23/0807; C08L 23/14; C08L 23/142; C08L 23/16; C08L 23/18; C08L 23/20; F16L 9/14; F16L 11/04; Y10T 428/1352; Y10T 428/1386; Y10T 428/139; Y10T 428/1393; Y10T 428/1397
See application file for complete search history.

(56) References Cited

U.S. PATENT DOCUMENTS

| | | | |
|---|---|---|---|
| 5,071,912 A * | 12/1991 | Furuta | C08L 51/06 525/148 |
| 5,272,236 A | 12/1993 | Lai et al. | |
| 5,278,272 A | 1/1994 | Lai et al. | |
| 5,766,713 A | 6/1998 | Ravishankar et al. | |
| 6,047,740 A | 4/2000 | Ikeda et al. | |
| 6,054,544 A | 4/2000 | Finlayson et al. | |
| 6,335,410 B1 | 1/2002 | Finlayson et al. | |
| 6,656,552 B1 | 12/2003 | Crouse | |
| 7,055,552 B2 | 6/2006 | Hirai et al. | |
| 8,299,189 B2 | 10/2012 | Boone et al. | |
| 2004/0039108 A1 * | 2/2004 | Nishihara | C08K 5/01 524/543 |
| 2005/0067036 A1 | 3/2005 | Hirai et al. | |
| 2012/0252917 A1 | 10/2012 | Kisin et al. | |

FOREIGN PATENT DOCUMENTS

| | | |
|---|---|---|
| JP | 2002234973 A | 8/2002 |
| WO | 20020087645 A1 | 11/2002 |

OTHER PUBLICATIONS

Daimler specification "Textile-reinforced coolant hoses" DBL6254, Feb. 2006.
PCT/US2012/05978, International Search Report and Written Opinion of the International Searching Authority, Mailed Dec. 14, 2012.
PCT/ US2012/05978, International Preliminary Report on Patentability, Mailed Apr. 24, 2014.

* cited by examiner

*Primary Examiner* — Walter B Aughenbaugh

(57) ABSTRACT

The invention provides a composition comprising the following: A) an ethylene/α-olefin/diene interpolymer; B) an ethylene/α-olefin copolymer with a Mooney Viscosity [ML (1+4) at 125° C.] greater than 40; and C) a peroxide; and wherein the α-olefin of the ethylene/α-olefin copolymer of component B comprises at least four carbon atoms; and wherein component A is present in an amount from 50 to 95 weight percent, based on the sum weight of components A and B.

14 Claims, No Drawings

POLYMER COMPOSITIONS WITH IMPROVED RETENTION OF PROPERTIES UNDER MECHANICAL AND THERMAL STRESSES

REFERENCE TO RELATED APPLICATIONS

The present application claims the benefit of U.S. Provisional Application No. 61/545,281, filed on Oct. 10, 2011, incorporated herein by reference.

BACKGROUND OF THE INVENTION

Coolant hoses in vehicles transfer the coolant fluid from the engine to the radiator, and are subject to high heat loads from radiated heat sources, and thus, must withstand high temperatures in service. It is not acceptable for hoses to fail during service, and buyers of vehicles increasingly demand that the original hoses last the entire life of the vehicle, which is often in excess of 200,000 km.

Ethylene/propylene/diene terpolymer (EPDM) rubbers are used to make the majority of coolant hoses for vehicles, and the types of polymers used are often specified in the manufacturers specifications, such as, for example, the Daimler specification DBL6254. This specification describes the required properties of elastomeric compositions before and after aging at specified temperatures. Other elastomeric compositions are disclosed in U.S. Pat. No. 6,047,740; WO 1997/000286; and WO 2011/079207. There is a need for elastomeric compositions with improved retention of mechanical properties and good thermal properties, and which can be used in high temperature applications. This need is met by the following invention.

SUMMARY OF THE INVENTION

The invention provides a composition comprising the following:
A) an ethylene/α-olefin/diene interpolymer;
B) an ethylene/α-olefin copolymer with a Mooney Viscosity [ML(1+4) at 125 C] greater than 40; and
C) a peroxide; and
  wherein the α-olefin of the ethylene/α-olefin copolymer of component B comprises at least four carbon atoms; and
  wherein component A is present in an amount from 50 to 95 weight percent, based on the sum weight of components A and B.

DETAILED DESCRIPTION OF THE INVENTION

As discussed above, the invention provides a composition comprising the following:
A) an ethylene/α-olefin/diene interpolymer;
B) an ethylene/α-olefin copolymer with a Mooney Viscosity [ML(1+4) at 125° C.] greater than 40; and
C) a peroxide; and
  wherein the α-olefin of the ethylene/α-olefin copolymer of component B comprises at least four carbon atoms; and
  wherein component A is present in an amount from 50 to 95 weight percent, based on the sum weight of components A and B.

An inventive composition may comprise a combination of two or more embodiments as described herein.

In one embodiment, component A is present in an amount from 50 to 90 weight percent, based on the sum weight of components A and B.

In one embodiment, component A is present in an amount from 50 to 85 weight percent, based on the sum weight of components A and B.

In one embodiment, component A is present in an amount from 50 to 80 weight percent, based on the sum weight of components A and B.

In one embodiment, the ethylene/α-olefin copolymer of component B has a percent crystallinity less than 20, or less than 18, as measured by DSC.

In one embodiment, the ethylene/α-olefin/diene interpolymer of component A has a percent crystallinity less than 20, or less than 18, or less than 16, as measured by DSC.

In one embodiment, the ethylene/α-olefin copolymer of component B is a homogeneously branched linear ethylene/α-olefin copolymer or a homogeneously branched substantially linear ethylene/α-olefin copolymer.

In one embodiment, the ethylene/α-olefin copolymer of component B has a Processing Rheology Ratio (PRR) value greater than, or equal to, 4.0.

In one embodiment, the ethylene/α-olefin copolymer of component B has an "ethylene to α-olefin" molar ratio from 75/25 to 90/10.

In one embodiment, the ethylene/α-olefin/diene interpolymer of component A is an EPDM.

In one embodiment, the weight ratio of "component A/component B" is from 9/1 to 1/1.

In one embodiment, the weight ratio of "component A/component B" is from 2/1 to 9/1.

In one embodiment, the weight ratio of "component A/component B" is from 2/1 to 4/1.

In one embodiment, component A is present in an amount greater than, or equal to, 60 weight percent, or greater than, or equal to, 70 weight percent, or greater than, or equal to, 80 weight percent, based on the sum weight of component A and component B.

In one embodiment, component A is present in an amount less than, or equal to, 95 weight percent, or less than, or equal to, 90 weight percent, based on the sum weight of component A and component B.

In one embodiment, components A and B comprise at least 80 weight percent, or at least 90 weight percent, or at least 95 weight percent, based on the weight of all the polymer components of the composition.

In one embodiment, components A and B comprise at less than, or equal to, 100 weight percent, or less than, or equal to, 98 weight percent, or less than, or equal to, 95 weight percent, based on the weight of all the polymer components of the composition.

In one embodiment, components A and B comprise from 10 to 50 weight percent, or from 15 to 40 weight percent, or from 20 to 35 weight percent of the composition (based on the weight of the composition).

In one embodiment, component A is present in an amount greater than 15 weight percent, or greater than 18 weight percent, or greater than 20 weight percent, based on the weight of the composition.

In one embodiment, component A is present in an amount less than 50 weight percent, or less than 40 weight percent, or less than 30 weight percent, based on the weight of the composition.

In one embodiment, component B is present in an amount from 2 to 25 weight percent, or from 2.5 to 20 weight percent, or from 3 to 15 weight percent, based on the weight of the composition.

The ethylene/α-olefin/diene interpolymer (Component A) and the ethylene/α-olefin copolymer (Component B) of the inventive composition are not modified with one or more functional groups. For example, these polymers are not silane-grafted, maleic anhydride-grafted, nor TEMPO-grafted polymers. It is understood that some functionality may be incorporated into component A and/or component B after the inventive composition undergoes a crosslinking reaction.

In one embodiment, the composition further comprises at least one additive.

In one embodiment, the composition further comprises at least one filler. In a further embodiment, the filler is selected from the group consisting of carbon black, CaCO3, silica, and combinations thereof. In a further embodiment, the filler is selected from the group consisting of carbon black, CaCO3, and combinations thereof.

In one embodiment, the composition comprises at least one filler. In a further embodiment, the composition comprises less than 70 weight percent, or less than 60 weight percent, or less than 50 weight percent, of the filler, based on the weight of the composition. In a further embodiment, the filler is carbon black.

In one embodiment, the composition comprises at least one filler. In a further embodiment, the composition comprises greater than 20 weight percent, or greater than 25 weight percent, or greater than 30 weight percent, of the filler, based on the weight of the composition. In a further embodiment, the filler is carbon black.

In one embodiment, the composition has an "MH-ML" value greater than the value obtained from an identical composition comprising the same components, except less than 50 weight percent component A, based on the sum weight of components A and B.

An inventive composition may comprise a combination of two or more embodiments as described herein.

The ethylene/α-olefin/diene interpolymer of Component A may comprise a combination of two or more embodiments as described herein.

The ethylene/α-olefin copolymer of Component B may comprise a combination of two or more embodiments as described herein.

The invention also provides a crosslinked composition formed from an inventive composition.

In one embodiment, the crosslinked composition has a Compression set (22 hrs, 23° C.) less than the value from an identical composition comprising the same components, except less than 50 weight percent of component A, based on the sum weight of components A and B.

In one embodiment, the crosslinked composition maintains a greater amount of "strength at break" after aging at 150° C. for one week (7 days) compared to an identical composition, except comprising less than 50 weight percent, further less than 40 weight percent, further less than 30 weight percent, of component B, based on the sum weight of components A and B.

In one embodiment, the crosslinked composition maintains a greater amount of "elongation at break" after aging at 150° C. for one week (7 days) compared to an identical composition, except comprising less than 50 weight percent, further less than 40 weight percent, further less than 30 weight percent, of component B, based on the sum weight of components A and B.

In one embodiment, the crosslinked composition maintains a greater amount of "strength at break" after aging at 150° C. for one week (7 days) compared to an identical composition, except comprising no component B.

In one embodiment, the crosslinked composition maintains a greater amount of "elongation at break" after aging at 150° C. for one week (7 days) compared to an identical composition, except comprising no component B.

The invention also provides an article comprising at least one component formed from an inventive composition. In one embodiment, the article is an automotive part. In a further embodiment, the article is a hose. In another embodiment, the article is a building profile.

In one embodiment, the article is an engine component.

An inventive composition may comprise a combination of two or more embodiments as described herein.

An inventive crosslinked composition may comprise a combination of two or more embodiments as described herein.

An inventive article may comprise a combination of two or more embodiments as described herein.

It has been discovered that the inventive compositions provide a better balance of curing properties and retained mechanical properties (for example, hardness, tensile strength, elongation, and compression set) after being subjected to mechanical stress and thermal stress, as compared to comparative compositions, as discussed below. It has been discovered that the inventive compositions have better thermal stability compared to a composition based only on EPDM, and this improved stability can be achieved when only a portion of the EPDM is replaced with an ethylene-alpha-olefin copolymer, as described herein. It has also been discovered that ethylene-alpha-olefin copolymers, as described herein, with Mooney viscosities (ML(1+4)125° C.) greater than 40, are more suitable for providing compositions with good responses to peroxide cure. Theses improved properties are needed in applications that are subject to elevated temperatures, such as, for example, automotive engine parts.

Ethylene/α-Olefin/Diene Interpolymers

The ethylene/α-olefin/diene interpolymers comprise, in polymerize form, ethylene, an α-olefin, and a diene. The diene may be conjugated or nonconjugated, and is preferably nonconjugated. Suitable examples of α-olefins include the C3-C10 α-olefins, and preferably propylene. Suitable examples of nonconjugated dienes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a preferred embodiment, the interpolymer is an ethylene/propylene/diene (EPDM) terpolymer. In a further embodiment, the diene is 5-ethylidene-2-norbornene (ENB).

In one embodiment, the diene is a nonconjugated diene. Illustrative nonconjugated dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/diene interpolymer is prepared in the presence of a single site catalyst, such as a constrained geometry catalyst (CGC), for example, a monocyclopentadienyl titanium complex; or a polyvalent aryloxyether compound. Some examples of constrained geometry catalysts are described in U.S. Pat. Nos. 5,272,236 and 5,278,272; each fully incorporated herein by reference. Some examples of polyvalent aryloxyether compounds are described in U.S. Publication No. 2005/0164872 and International Publication No. WO 2007/136494; each fully incorporated herein by reference.

In one embodiment, the ethylene/α-olefin/diene interpolymer comprises a majority amount of polymerized ethylene, based on the weight of the interpolymer. In a further embodiment, the amount of polymerized ethylene is from 55 to 95 weight percent, or from 60 to 90 weight percent, or from 65 to 85 weight percent, based on the weight of the interpolymer.

In one embodiment, the ethylene/α-olefin/diene interpolymer has a molecular weight distribution (Mw/Mn) from 1.5 to 5.0, or from 2.0 to 4.5, or from 2.0 to 4.0. All individual values and subranges from 1.5 to 5.0 are included herein and disclosed herein. In a preferred embodiment, the interpolymer is an EPDM. In a further embodiment, the diene is (ENB).

In one embodiment, the ethylene/α-olefin/diene interpolymer has a molecular weight distribution (Mw/Mn) from 2.0 to 3.5, or from 2.0 to 3.0, or from 2.0 to 2.5. All individual values and subranges from 2.0 to 3.5 are included herein and disclosed herein. In a preferred embodiment, the interpolymer is an EPDM. In a further embodiment, the diene is (ENB).

In one embodiment, the ethylene/α-olefin/diene interpolymer has a Mooney viscosity, ML(1+4) at 125° C., greater than, or equal to, 50, or greater than, or equal to, 60, or greater than, or equal to 70, or greater than, or equal to 80. In a preferred embodiment, the interpolymer is an EPDM. In a further embodiment, the diene is (ENB).

In one embodiment, the ethylene/α-olefin/diene interpolymer has a Mooney viscosity, ML(1+4) at 125° C., less than 200, or less than, or equal to, 150, or less than, or equal to, 100. In a preferred embodiment, the interpolymer is an EPDM. In a further embodiment, the diene is (ENB).

In one embodiment, the ethylene/α-olefin/diene interpolymer has a Mooney viscosity, ML(1+4) at 125° C., from 50 to 200, or from 60 to 150, or from 70 to 100. In a preferred embodiment, the interpolymer is an EPDM. In a further embodiment, the diene is (ENB).

Mooney viscosity is that of the neat interpolymer (or calculated viscosity of neat polymer for polymers that contain a filler, such as carbon black, and/or an oil). The neat polymer refers to the polymer without filler and without oil.

An ethylene/α-olefin/diene interpolymer may comprise a combination of two or more embodiments as described herein.

An EPDM terpolymer may comprise a combination of two or more embodiments as described herein.

Ethylene/α-Olefin Copolymers

Suitable ethylene/α-olefin copolymers include heterogeneous linear ethylene/α-olefin copolymers, homogeneously branched linear ethylene/α-olefin copolymers, and homogeneously branched substantially linear ethylene/α-olefin copolymers; and preferably homogeneously branched linear ethylene/α-olefin copolymers, and homogeneously branched substantially linear ethylene/α-olefin copolymers; and more preferably homogeneously branched substantially linear ethylene/α-olefin copolymers. Respective polymers can be prepared with Ziegler-Natta catalysts; metallocene or vanadium-based single-site catalysts; or constrained geometry single-site catalysts, or polyvalent aryloxyether compounds. Preferred α-olefins have from 4 to 12 carbon atoms, more preferably from 4 to 8 carbon atoms, and include 1-butene, 4-methyl-1-pentene, 1-hexene, and 1-octene, and preferably 1-butene, 1-hexene and 1-octene, and more preferably 1-butene and 1-octene.

In one embodiment, the ethylene/α-olefin copolymer is a heterogeneous linear ethylene/α-olefin copolymer. Heterogeneous linear ethylene/α-olefin copolymers include linear low density polyethylene (LLDPE), ultra-low density polyethylene (ULDPE), and very low density polyethylene (VLDPE). In a further embodiment, the α-olefin is selected from 1-butene, 1-hexene or 1-octene, and preferably from 1-octene or 1-butene.

In one embodiment, ethylene/α-olefin copolymer is a homogeneously branched linear ethylene/α-olefin copolymer or a homogeneously branched, substantially linear ethylene/α-olefin copolymer. In a further embodiment, the α-olefin is selected from 1-butene, 1-hexene or 1-octene, and preferably from 1-octene or 1-butene.

In one embodiment, ethylene/α-olefin copolymer is a homogeneously branched, substantially linear ethylene/α-olefin copolymer. In a further embodiment, the α-olefin is selected from 1-butene, 1-hexene or 1-octene, and preferably from 1-octene or 1-butene.

In one embodiment, ethylene/α-olefin copolymer is a homogeneously branched, linear ethylene/α-olefin copolymer. In a further embodiment, the α-olefin is selected from 1-butene, 1-hexene or 1-octene, and preferably from 1-octene or 1-butene.

The terms "homogeneous" and "homogeneously-branched" are used in reference to an ethylene/α-olefin copolymer, in which the α-olefin comonomer is randomly distributed within a given polymer molecule, and all of the polymer molecules have the same or substantially the same comonomer/ethylene ratio. The homogeneously branched ethylene/α-olefin copolymers include homogeneously branched linear ethylene/α-olefin copolymers, and homogeneously branched substantially linear ethylene/α-olefin copolymers.

Included amongst the homogeneously branched linear ethylene/α-olefin copolymers are ethylene copolymers, which lack long chain branching (or measurable amounts of long chain branching), but do have short chain branches, derived from the comonomer polymerized into the copolymer, and which comonomer is homogeneously distributed, both within the same polymer chain, and between different polymer chains. That is, homogeneously branched linear ethylene/α-olefin copolymers lack long chain branching, just as is the case for the linear low density ethylene/α-olefin copolymers, and can be made using "uniform branching distribution" polymerization processes, as described, for example, by Elston in U.S. Pat. No. 3,645,992. Commercial examples of homogeneously branched linear ethylene/α-olefin copolymers include TAFMER polymers supplied by the Mitsui Chemical Company, and EXACT polymers supplied by the ExxonMobil Chemical Company.

As discussed above, the homogeneously branched linear ethylene/α-olefin copolymers are described, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each fully incorporated herein by reference.

The homogeneously branched substantially linear ethylene/α-olefin copolymers are described in, for example, U.S. Pat. Nos. 5,272,236; 5,278,272; 6,054,544; 6,335,410 and 6,723,810; each fully incorporated herein by reference. The substantially linear ethylene/α-olefin copolymers are those in which the comonomer is randomly distributed within a given polymer molecule, and in which all of the polymer molecules have the same or substantially the same comonomer/ethylene ratio. In addition, the substantially linear ethylene/α-olefin copolymers have long chain branching (chain branch has more carbon atoms than a branched formed by the incorporation of one comonomer into the polymer backbone). The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. Polymers include the ENGAGE Polyolefin Elastomers available from The Dow Chemical Company. In contrast to the homogeneously branched substantially linear ethylene/α-olefin copolymers, the homogeneously branched linear ethylene/α-olefin copolymers lack measurable or demonstrable long chain branches.

The homogeneously branched substantially linear ethylene/α-olefin copolymers form a unique class of homogeneously branched ethylene polymers. They differ substantially from the well-known class of conventional, homogeneously branched linear ethylene/α-olefin copolymers, described by Elston in U.S. Pat. No. 3,645,992, and, moreover, they are not in the same class as conventional heterogeneous, "Ziegler-Natta catalyst polymerized" linear ethylene/α-olefin copolymers (for example, LLDPE, ULDPE and VLDPE), made, for example, using the technique disclosed by Anderson et al., in U.S. Pat. No. 4,076, 698); nor are they in the same class as high pressure, free-radical initiated, highly branched polyethylenes, such as, for example, low density polyethylene (LDPE), ethyleneacrylic acid (EAA) copolymers, and ethylene vinyl acetate (EVA) copolymers.

The homogeneously branched, substantially linear ethylene/α-olefin copolymers have excellent processability, even though they have a relatively narrow molecular weight distribution. Surprisingly, the melt flow ratio ($I_{10}/I_2$), according to ASTM D 1238, of the substantially linear ethylene/α-olefin copolymers can be varied widely, and essentially independently of the molecular weight distribution ($M_w/M_n$ or MWD). This surprising behavior is completely contrary to conventional homogeneously branched linear ethylene/α-olefin copolymers, such as those described, for example, by Elston in U.S. Pat. No. 3,645, 992, and heterogeneously branched "conventional Ziegler-Natta polymerized" linear ethylene/α-olefin copolymers, such as those described, for example, by Anderson et al., in U.S. Pat. No. 4,076,698. Unlike the substantially linear ethylene/α-olefin copolymers, linear ethylene/α-olefin copolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., 1989, C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17,1301 (1949), and Rudin, A., Modern Methods of Polymer Characterization, John Wiley & Sons, New York (1991) pp. 103-112.

The homogeneous branched ethylene/α-olefin copolymers will preferably have a single melting peak, as measured using Differential Scanning calorimetry (DSC), in contrast to heterogeneously branched ethylene/α-olefin copolymers, which have two or more melting peaks, due to the heterogeneously branched polymers broad short chain branching distribution.

In one embodiment, the ethylene/α-olefin copolymer has a Mooney viscosity, ML(1+4) at 125° C., greater than, or equal to, 41, or greater than, or equal to, 43, or greater than, or equal to 45, or greater than, or equal to, 50. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a Mooney viscosity, ML(1+4) at 125° C., less than 150, or less than, or equal to, 120, or less than, or equal to, 100. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a Mooney viscosity, ML(1+4) at 125° C., from 41 to 150, or from 43 to 120, or from 45 to 100, or from 50 to 100. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a melt index ($I_2$) less than, or equal to, 1 g/10 min, or less than, or equal to 0.5 g/10 min, or less than, or equal to 0.2 g/10 min, or less than, or equal to 0.1 g/10 min, as determined using ASTM D-1238 (190° C., 2.16 kg load). In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a density less than, or equal to, 0.920 g/cm$^3$, or less than, or equal to, 0.910 g/cm$^3$, or less than, or equal to, 0.900 g/cm$^3$, or less than, or equal to, 0.890 g/cm$^3$, or less than, or equal to 0.880 g/cm$^3$ (1 cm$^3$=1 cc). In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a density greater than, or equal to, 0.850 g/cm$^3$, or greater than, or equal to, 0.855 g/cm$^3$, or greater than, or equal to, 0.860 g/cm$^3$. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a density from 0.850 g/cm$^3$ to 0.920 g/cm$^3$, or from 0.855 g/cm$^3$ to 0.910 g/cm$^3$, or from 0.860 g/cm$^3$ to 0.900 g/cm$^3$. All individual values and subranges from 0.850 g/cm$^3$ to 0.920 g/cm$^3$ are included herein and disclosed herein. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a molecular weight distribution ($M_w/M_n$) less than, or equal to, 3.5, or less than, or equal to, 3.0, or less than, or equal to, 2.5. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a molecular weight distribution ($M_w/M_n$) greater than, or equal to, 1.2, or greater than, or equal to, 1.5, or greater than, or equal to, 1.7. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a molecular weight distribution from 1.2 to 3.5, or from 1.5 to 3.0, or from 1.7 to 2.5. All individual values and subranges from 1.2 to 3.5 are included herein and disclosed herein. In a further embodiment, the ethylene/α-olefin copolymer is a homogeneously branched linear ethylene/α-olefin copolymer or a homogeneously branched substantially linear ethylene/α-olefin copolymer, and further a homogeneously branched substantially linear ethylene/α-olefin copolymer.

In one embodiment, the ethylene/α-olefin copolymer has a PRR (Processing Rheology Ratio) greater than, or equal to, 4.0, or greater than, or equal to, 5.0, or greater than, or equal to, 6.0.

In one embodiment, the ethylene/α-olefin copolymer has a PRR from 4.0 to 70, or from 4.0 to 60, or from 4.0 to 55.

Interpolymer viscosity is conveniently measured in poise (dyne-second/square centimeter (d-sec/cm2)) at shear rates within a range from 0.1 to 100 radian per second (rad/sec), at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as "V0.1" and "V100," with a ratio of the two referred to as "RR," and expressed as "V0.1/V100."

The PRR value is calculated by the formula:
PRR=RR+[3.82−interpolymer Mooney Viscosity (ML1+4 at 125° C.)]×0.3. The PRR determination is described in U.S. Pat. No. 6,680,361 (see also equivalent WO 00/26268), fully incorporated herein by reference.

An ethylene/α-olefin copolymer may comprise a combination of two or more embodiments as described herein.

Peroxides

The peroxide is preferably an organic peroxide. Suitable organic peroxides have a half life of at least one hour at 120° C. Illustrative peroxides include, but are not limited to, a series of vulcanizing and polymerization agents that contain α,α'-bis(t-butylperoxy)-diisopropylbenzene, and are available from Hercules, Inc., under the trade designation VUL-CUP; a series of such agents that contain dicumyl peroxide, and are available from Hercules, Inc., under the trade designation DI-CUP; as well as LUPERSOL peroxides made by Elf Atochem, North America; or TRIGONOX organic peroxides made by Akzo Nobel. The LUPERSOL peroxides include LUPERSOL 101 (2,5-dimethyl-2,5-di(t-butylperoxy)hexane), LUPERSOL 130 (2,5-dimethyl-2,5-di (t-butylperoxy)hexyne-3) and LUPERSOL 575 (t-amyl peroxy-2-ethylhexonate). Other suitable peroxides include 2,5-dimethyl-2,5-di-(t-butyl peroxy)hexane, di-t-butylperoxide, di-(t-amyl)peroxide, 2,5-di(t-amyl peroxy)-2,5-dimethylhexane, 2,5-di-(t-butylperoxy)-2,5-diphenylhexane, bis(alpha-methylbenzyl)peroxide, benzoyl peroxide, t-butyl per-benzoate, 3,6,9-triethyl-3,6,9-trimethyl-1,4,7-triperoxonane and bis(t-butylperoxy)-diisopropylbenzene.

In one embodiment, an inventive composition further comprises a free radical coagent. Suitable free radical coagents include, but are not limited to, diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate, allyl methacrylate, N N'-m-phenylene bismaleimide, toluene bismaleimide-p-quinone dioxime, nitrobenzene, diphenylguanidine. Preferred coagents are triallylcyanurate, 1,2 polybutadiene, divinyl benzene, and trimethyolpropane trimethacrylate.

The amount of the peroxide can range from about 0.5 to 10 parts by weight, based upon 100 parts of the polymers in the composition. Crosslinking temperatures and time employed are typical. Temperatures from about 250° F. to about 440° F., and times ranging from about one minute to about 120 minutes, can be employed.

In the inventive compositions, a peroxide cure system is used in order to crosslink not only the ethylene/α-olefin/diene interpolymer component, but also the ethylene/α-olefin copolymer component. Were a sulfur vulcanization system to be chosen, the ethylene-alpha-olefin copolymers would remain essentially uncrosslinked in the final article, because a sulfur crosslinking system selectively crosslinks the ethylene/α-olefin/diene interpolymer component, but essentially does not react with the ethylene-alpha-olefin copolymer component. The ethylene-alpha-olefin copolymers remain in an essentially uncured state in the final article. Unless both phases are adequately crosslinked, the final properties of the crosslinked composition are adversely affected in applications requiring resistance to thermal and mechanical stresses.

The peroxide of component C may comprise a combination of two or more embodiments as described herein.

Additives

An inventive composition may comprise one or more additives. Suitable additives include, but are not limited to, fillers, antioxidants, UV stabilizers, flame retardants, plasticizers or oils, colorants or pigments, and combinations thereof.

Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly(alphamethyl)-styrene resins, natural fibers, synthetic fibers, and the like.

Plasticizers include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

In one embodiment, the composition further comprises at least one oil. In a further embodiment, the oil is present in an amount greater than 10 weight percent, or greater than 15 weight percent, or greater than 20 weight percent, based on the weight of the composition.

In one embodiment, the oil is present in an amount less than 50 weight percent, or less than 40 weight percent, or less than 30 weight percent, based on the weight of the composition.

Applications

The compositions of the present invention may be used to prepare a variety of articles or their component parts or portions. The inventive compositions may be converted into a finished article by any one of a number of conventional processes and apparatus. Illustrative processes include, but are not limited to, extrusion, calendering, compression molding, and other typical thermoset material forming processes. For example, articles can be prepared by extrusion, extrusion followed by additional thermal treatment, low pressure molding, compression molding, and the like.

Articles include, but are not limited to, sheets, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

DEFINITIONS

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter.

The term "interpolymer," as used herein, refers to a polymer prepared by the polymerization of at least two different types of monomers. The term interpolymer thus includes the term copolymer (employed to refer to a polymer prepared from two different types of monomers), and also includes a polymer prepared from more than two different types of monomers.

The term "ethylene-based polymer," as used herein, refers to a polymer that comprises, in polymerized form, a majority weight percent of ethylene (based on the weight of the interpolymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer," comprises a majority weight percent of ethylene (based on the weight of the interpolymer).

The term "ethylene/α-olefin/diene terpolymer," as used herein, refers to a polymer that comprises, in polymerized form, ethylene, an α-olefin, and a diene, as the only monomer types. In one embodiment, the "ethylene/α-olefin/diene terpolymer," comprises a majority weight percent of ethylene (based on the weight of the terpolymer).

The term, "ethylene/α-olefin copolymer," as used herein, refers to a copolymer that comprises, in polymerized form, a majority weight percent of ethylene (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability.

The term "consisting of" excludes any component, step, or procedure not specifically delineated or listed.

Test Methods

MDR

The MDR curves were measured by placing a "30 mm diameter" puck of the uncured sheet from the roll mill (see experimental section) into the chamber of an Alpha Technologies MDR. A sheet of "100 micron thick" MYLAR film was placed above and below the puck. The chamber was pre-heated to the temperature of the test, which was chosen to be the same as the temperature (for example, 180° C.) used to crosslink the composition. The chamber was closed, and the upper die of the MDR oscillated at 1.667 Hertz, and with 0.5° of arc, and the torque generated was measured, using a torque transducer on the lower die. The torque was recorded as a function of time, using the units "dNm (deci Newton meter)." Two torque numbers were recorded: ML, the minimum torque recorded, and MH, the maximum torque recorded. The difference between these two numbers, "MH-ML," gives an indication of the "degree of cure," or the "degree of crosslinking." The degree of cure is an indication of the tightness (or perfection) of the crosslinked network, and predicts mechanical property features, such as the tensile strength, and creep properties, such as the compression set. Another number, the rate of cure, known as "Rh", is the fastest gradient of the torque increase measured, and is measured in "dNm/minute."

Mooney Viscosity

Mooney viscosity of the polymer was measured according to ASTM 1646, using an Alpha-Technologies Mooney Rheometer. A "3 mm thick" sheet was molded from the polymer to be tested, at 180° C., under 5 bar pressure, for 5 minutes, in a compression molding machine. The molded sheet was cooled at "100° C./minute" to room temperature. Two "30 mm diameter" discs were cut from the sheet, and a "6 mm hole" was cut in the center of one of the discs. A sheet of MYLAR film of "100 micron thickness" was placed on the lower chamber of the Mooney machine, which was pre-heated to the test temperature (125° C. in this case). The disc with the hole was placed on this sheet of MYLAR film (which also had a hole cut in it), and the large Mooney rotor was placed into the machine. The second disc was placed on top of the rotor, a second sheet of MYLAR film was placed on top of the second disc, and the machine was closed. After a "one minute preheat time," the rotor rotated at 2 rpm for four additional minutes. After this time, the torque reading gave the Mooney viscosity as "ML(1+4)125° C."

DSC

The crystallinity level of the polymers was measured using a Differential Scanning calorimeter (DSC). A Perkin-Elmer DSC 6000 was used. From the pressed plate made for measurement of the Mooney viscosity, a "10 mg" sample was cut using a scalpel. The sample was weighed accurately to "+/−0.01 mg," and placed in a sample holder. The sample was first pre-heated at "10° C. per minute" to 180° C., to remove the heat history of the sample, and then cooled at "10° C. per minute" to −40° C. The sample was then heated at "10° C. per minute to determine the Tm." From the cooling thermogram, the crystallization temperature was determined by setting a tangent to the crystallization exotherm of the polymer. The crystallization temperature was reported as the onset of crystallization, described by the intersect of the tangent and the baseline. The percentage crystallinity was determined by the area of the fusion peak of the melting endotherm in the second heating thermogram. The percentage crystallinity was determined by using "292 J/g" as the heat of fusion of a theoretical polyethylene with 100% crystallinity.

Compound Hardness

Compound hardness was measured to Shore A, according to ISO 868:2003 at 23° C., using a machine manufactured by Zwick Roell (model 7206.07/00). The stylus contacted the cured specimen for three seconds before the reading was taken. The test specimens were cut from cured sheets (see the experimental section below). Test sample dimensions were "25 mm×25 mm×2 mm," and the samples were stacked to thickness of "6 mm" for the hardness measurement.

Tensile Properties

Tensile properties were tested according to ISO527, using a Zwick tensile tester at a crosshead speed of 500 mm/minute and using a 1 kN load cell. Test pieces were cut from cured sheets (see experimental section below) using a cutter designed to cut out test pieces for the ISO 527 T2 specification.

Compression Set

Compression set was measured according to ISO 815. Test pieces "13 mm diameter" were cut from the "2 mm thick" cured sheet (see the experimental section below) and plied into stacks of three pieces with a total height of approximately 6 mm. The height of each piece was measured, and spacers chosen to give a compression of 25% of the actual height of the plied specimen. The specimen was placed in the compression molding jig, and the jig tightened onto the spacers to give 25% compression. The jig was placed in a oven for the time and temperature specified (22 hours at 23° C.). After this time, the jig was opened and placed on a wooden surface, and the new height of the samples is measured after 30 minutes. The percent of the set taken by the sample was calculated according to ISO 815.

Melt index (I2) of an ethylene-based polymer is measured in accordance with ASTM D-1238, condition 190° C./2.16 kg. Melt index (I5) of an ethylene-based polymer is measured in accordance with ASTM D-1238, condition 190° C./5.0 kg. Melt index (I10) of an ethylene-based polymer is measured in accordance with ASTM D-1238, condition 190° C./10.0 kg. High load melt index (I21) of an ethylene-based polymer is measured in accordance with ASTM D-1238, condition 190° C./21.0 kg.

Polymer density is measured in accordance with ASTM D-792.

EXPERIMENTAL

The polymer components of the compositions used in this study are listed in Table 1, and a summary of the compositions is shown in Table 2.

TABLE 1

Polymers

| | Percent Crystallinity | Tm (° C.) | MV [ML(1 + 4), 125° C.] |
|---|---|---|---|
| ENGAGE 7387 HM* | 16 | 42 | 53-54 |
| NORDEL IP 4785 HM** | 13 | 34 | 85-86 |

*Ethylene/butene copolymer; PRR of 4.0; density of 0.870 g/cc.
**EPDM.

TABLE 2

Compositions

| Ingredient | Parts per hundred rubber (ENGAGE 7387 HM and NORDEL IP 4785 HM) |
|---|---|
| ENGAGE 7387 HM | variable |
| NORDEL IP 4785 HM | variable |
| N550 carbon black | 90.00 |
| SUNPAR 2280 paraffinic oil | 45.00 |
| OMYA BSH calcium carbonate | 20.00 |
| LUPEROX F40P-SP2 scorch protected peroxide | 7.00 |
| SR350 trimethylolpropane trimethacrylate coagent | 1.50 |
| Zinc oxide | 3.00 |
| IRGANOX 1035 [thiodiethylene bis[3-(3,5-di-tert-butyl-4-hydroxyphenyl)propionate] | 2.00 |
| IRGANOX PS 802 (dialkyl ester of thiodipropionic acid) | 2.00 |

SUNPAR 2280 is supplied by Petronas Lubricants
OMYA BSH is supplied by Omya AG
LUPEROX F-40-SP2 is supplied by Arkema
SR350 coagent was supplied by Sartomer
IRGANOX 1035 and PS802 are supplied by BASF
Zinc oxide was supplied by Silox SA All compositions were prepared in a HARBURG-FREUDENBERGER GK 1.5E, intermeshing internal mixer, with a "1.5 liter" volume. The temperature of the water in the heating jacket of the mixing chamber was 50° C. All components were added at once, and mixed at varying rpm, to allow the formulation temperature to reach 95° C. The ram was lifted, the ram was swept and re-lowered, and the composition mixed for a further 60 seconds. After this time, the door below the mixer was opened to release the uncured composition into a receptacle.

Sheets of uncured composition approximately "5 mm" thick were obtained by passing the composition between the rolls of a "15 cm" two-roll mill, manufactured by J. R. Dare (model "300×150 mm" LAB MILL). The temperature of the water in the rolls was maintained at 60° C., and the roll speed was 20 rpm. The uncured sheets were crosslinked in a BÜRKLE compression molding press, by placing "75 cc" of the uncured sheet into a mold form of dimensions "15 cm by 15 cm by 2 mm". The mold was closed with a pressure of 50 bar, at 180° C., for a time of "t90+3 minutes", where t90 is the time to reach 90% cure, as measured using an Alpha Technologies MDR, according to ISO6502 at 180° C. Properties of the crosslinked compositions are shown in Table 3. Samples were aged in hot air according to the conditions described in ISO 188 for time and temperature as shown in this table.

TABLE 3

Properties of Crosslinked Compositions

|  |  | Comp. Ex. A | Ex. 1 | Ex. 2 | Ex. 3 | Comp. Ex. B | Comp. Ex. C |
|---|---|---|---|---|---|---|---|
| ENGAGE 7387 HM (B) |  | 0 | 10 | 20 | 50 | 75 | 100 |
| NORDEL IP 4785 HM (A) |  | 100 | 90 | 80 | 50 | 25 | 0 |
| MDR t90 | min | 4.3 | 4.3 | 4.3 | 4.2 | 4.1 | 3.9 |
| MH − ML | dNm | 22.1 | 21.5 | 20.8 | 18.6 | 16.9 | 15.4 |
| Compression Set (22 hr at 23° C.) | % | 15.9 | 15.0 | 16.8 | 19.0 | 19.4 | 22.8 |
| Hardness | ShA, 3 s | 75.0 | 75.2 | 76.0 | 77.9 | 79.1 | 79.8 |
| Strength at Break | MPa | 16.3 | 16.3 | 16.0 | 15.3 | 14.5 | 13.4 |
| Elongation at Break | % | 526 | 518 | 551 | 568 | 628 | 457 |
| Aged one week (7 days) at 150° C. |  |  |  |  |  |  |  |
| Hardness | ShA, 3 s | 85.4 | 85.4 | 85.8 | 88.1 | 85.2 | 86.3 |
|  | change | +10.4 | +10.2 | +9.8 | +10.2 | +6.1 | +6.5 |
| Strength at Break | MPa | 8.1 | 8.7 | 8.8 | 9.2 | 9.4 | 9.2 |
|  | change | −51% | −46% | −45% | −40% | −36% | −31% |
| Elongation at Break | % | 78 | 93 | 98 | 131 | 171 | 276 |
|  | change | −85% | −82% | −82% | −77% | −73% | −40% |

As seen in Table 3, the inventive compositions provide the better balance of retained of properties under mechanical stress (see compression set data) and thermal stress (see aging data at 150° C.). Inventive Examples 1-3 has better (lower) compression set (22 hours, 23° C.) as compared to Comparative Examples B and C. Also, these inventive examples each had a higher degree of cure, as indicated by the "MH-ML" value, as compared to Comparative Examples B and C. The higher degree of cure and improved compression set are needed in applications that are subject to elevated temperatures, such as, for example, automotive engine parts. As seen in the aging data, the inventive examples had better retained "strength at break" and better retained "elongation at break" as compared to Comparative Example A. The inventive examples have improved temperature resistance compared to Comparative Example A, retaining a greater proportion of the initial "strength at break" and the initial "elongation at break" after aging at 150° C. for one week (7 days). The improved thermal stability is needed in applications that are subject to elevated temperatures, such as, for example, automotive engine parts.

It is also very important that the ethylene/alpha-olefin copolymer is readily curable by peroxide, to increase the degree of cure in the final composition containing both the ethylene/α-olefin/diene interpolymer and copolymer. To demonstrate this property, a selection of ethylene/alpha-olefin copolymers were crosslinked in the same 'additive formulation" as used in the previous examples, but without the EPDM component, and with an increased amount of the copolymer (the amount of additives stayed the same). The results are shown in Table 4. In this table, the five ethylene-alpha-olefin copolymers have Mooney viscosities (ML(1+4)125° C.) that vary from 19 to 54.

TABLE 4

Cure Response of Some Ethylene-alpha-olefin Copolymers

|  | Example 6 | Example 7 (ENGAGE 7387 HM) | Example 8 | Example 9 | Example 10 |
|---|---|---|---|---|---|
| Polymer Mooney | 47 | 53-54 | 19 | 25 | 33 |
| Copolymer | EB* | EB* | EB* | EO* | EO* |
| Polymer crystallinity, wt %, DSC | 13 | 16 | 12 | 13 | 16 |

TABLE 4-continued

Cure Response of Some Ethylene-alpha-olefin Copolymers

|  |  | Example 6 | Example 7 (ENGAGE 7387 HM) | Example 8 | Example 9 | Example 10 |
|---|---|---|---|---|---|---|
| ML | dNm | 1.4 | 1.4 | 0.7 | 0.8 | 1.0 |
| MH | dNm | 15.2 | 16.3 | 11.8 | 11.1 | 12.3 |
| MH − ML | dNm | 13.7 | 15 | 11 | 10 | 11 |
| Rh | dNm/min | 7.3 | 7.9 | 5.4 | 5.3 | 5.9 |
| t90 | min | 3.8 | 3.8 | 4.3 | 4.1 | 4.1 |

*EB = ethylene/butene copolymer; EO = ethylene/octene copolymer; all copolymers are homogeneously branched substantially linear copolymers.

The degree of cure of the copolymers can be measured on the MDR, and is represented by the difference between the torque minimum (ML), before crosslinking starts, and the torque maximum (MH), when the crosslinking is complete. The value "MH-ML" is a good predictor of many properties that depend on the tightness of the crosslink network, including mechanical and creep properties.

As seen in Table 4, the degree of cure is much higher for the copolymers with a Mooney viscosity greater than 40. The copolymers with Mooney viscosities less than 40 have "MH-ML" values of 10 or 11 dNm, whereas those with Mooney viscosities greater than 40 have higher "MH-ML" values of 13.7 and 15. Therefore, the copolymers with a higher Mooney viscosity will also give a tighter crosslinked network in the final composition, which, in turn, will result in improved mechanical properties, such as strength at break, and better creep properties, as indicated by compression set.

Although the invention has been described in considerable detail in the preceding examples, this detail is for the purpose of illustration, and is not to be construed as a limitation on the invention as described in the following claims.

The invention claimed is:

1. A composition comprising the following:
A) an ethylene/α-olefin/diene interpolymer;
B) an ethylene/α-olefin copolymer with a Mooney Viscosity [ML(1+4) at 125° C.] greater than 40; and
C) a peroxide; and
wherein the α-olefin of the ethylene/α-olefin copolymer of component B comprises at least four carbon atoms; and
wherein component A is present in an amount from 60 to 95 weight percent, based on the sum weight of components A and B; and
wherein components A and B comprise at least 80 weight percent, of the composition, based on the weight of all the polymer components of the composition.

2. The composition of claim 1, wherein the ethylene/α-olefin copolymer of component B has a percent crystallinity less than 20, as measured by DSC.

3. The composition of claim 1, wherein the ethylene/α-olefin/diene interpolymer of component A has a percent crystallinity less than 20, as measured by DSC.

4. The composition of claim 1, wherein the ethylene/α-olefin copolymer of component B is a homogeneously branched linear ethylene/α-olefin copolymer or a homogeneously branched substantially linear ethylene/α-olefin copolymer.

5. The composition of claim 1, wherein the ethylene/α-olefin copolymer of component B has a Processing Rheology Ratio (PRR) value greater than, or equal to, 4.0.

6. The composition of claim 1, wherein the ethylene/α-olefin/diene interpolymer of component A is an EPDM.

7. The composition of claim 1, further comprising at least one additive.

8. A crosslinked composition formed from the composition of claim 1.

9. An article comprising at least one component formed from the composition of claim 1.

10. The article of claim 9, wherein the article is an automotive part.

11. The article of claim 9, wherein the article is an engine component.

12. The article of claim 9, wherein the article is a hose.

13. The composition of claim 1, wherein the ethylene/α-olefin/diene interpolymer of component A has a Mooney Viscosity ML(1+4) at 125° C., greater than, or equal to 70.

14. The composition of claim 1, wherein the ethylene/α-olefin/diene interpolymer of component A has a Mooney Viscosity ML(1+4) at 125° C., greater than, or equal to 80.

* * * * *